United States Patent
Kaneko

[11] Patent Number: 5,956,210
[45] Date of Patent: Sep. 21, 1999

[54] STRUCTURE AND JIG FOR MOUNTING SPRING ARM ON CORRESPONDING HEAD ARM

[75] Inventor: Hisashi Kaneko, Kawasaki, Japan

[73] Assignee: Fujitsu Limited, Kawasaki, Japan

[21] Appl. No.: 08/951,236

[22] Filed: Oct. 16, 1997

[30] Foreign Application Priority Data

Mar. 19, 1997 [JP] Japan .................................. 9-066278

[51] Int. Cl.$^6$ ...................................................... G11B 5/54
[52] U.S. Cl. ............................................................. 360/104
[58] Field of Search ............................................... 360/104

[56] References Cited

U.S. PATENT DOCUMENTS

| | | | |
|---|---|---|---|
| 4,991,045 | 2/1991 | Oberg | 360/104 |
| 5,808,835 | 9/1998 | Fujiwara | 360/104 |

FOREIGN PATENT DOCUMENTS

| | | |
|---|---|---|
| 5217348 | 8/1993 | Japan . |
| 5234291 | 9/1993 | Japan . |
| 5303855 | 11/1993 | Japan . |
| 6103716 | 4/1994 | Japan . |
| 7192420 | 7/1995 | Japan . |
| 97324 | 1/1997 | Japan . |

*Primary Examiner*—Robert S. Tupper
*Attorney, Agent, or Firm*—Greer, Burns & Crain, Ltd.

[57] ABSTRACT

A structure for mounting at least a spring arm on at least a head arm is disclosed, which can meet the requirement for high recording density in a disk apparatus by effectively reducing the vibration of the head unit in operation. A head actuator includes at least a pair of heads mounted at the forward end of the head arm through the spring arm for reading/writing information in a discoidal recording medium. The base of the spring arm is fixedly welded to a fixing member. The head arm and the fixing member are coupled to each other by a caulking protrusion as a coupler formed on the fixing member. The overlapped portion of the head arm and the fixing member other than the coupler is formed with a vibration damping layer for preventing vibrations of one of the head arm and the fixing member from propagating to the other. This vibration damping layer is composed of a simple air gap or a vibration damping material filled in the air gap.

7 Claims, 12 Drawing Sheets

STRUCTURE AND JIG FOR MOUNTING SPRING ARM ON CORRESPONDING HEAD ARM

BACKGROUND OF THE INVENTION

1. Field of the Invention

The present invention relates to a structure and a jig for mounting a least a spring arm on at least a head arm, or more in particular to a structure for mounting spring arms on corresponding head arms and a mounting jig for assuring a structure free of resonance between each head arm and the corresponding spring arm.

2. Description of the Related Art

A disk apparatus for recording information on a discoidal medium (disk) using a head or reading the information recorded in the disk through the head has come to find application as an external storage unit for a computer system. Such a disk apparatus includes a magnetic disk apparatus for recording information using magnetism and an optical disk apparatus for recording information using light. Generally, a disk apparatus exchanges information with a disk by way of a head mounted at the forward end of a head actuator of a swinging type.

The recording density of such a disk apparatus as a magnetic disk apparatus is increasing and the cost thereof is being constantly reduced. As for the head actuator it is crucial to improve the positioning accuracy with which the head is located on the track of the disk on the one hand and to reduce the manufacturing cost on the other. Especially, a large-capacity magnetic disk apparatus with a track pitch of less than 3 $\mu$m has recently been developed. In such an apparatus, the data recording and reproducing operations are adversely affected by a positioning error of 1 $\mu$m or less of the head actuator.

If the head arm (also called the carriage) constituting the head actuator shares a resonance point with the corresponding spring arm (also called the load beam) mounted at the forward end of the head arm, the vibration would be exaggerated and deteriorate the head positioning accuracy. Therefore, each head arm and each spring arm are generally designed with the resonance points thereof displaced from each other.

In the event that the connection between a head arm and a corresponding spring arm is not sufficient or in the event that only inappropriate portions thereof are coupled, however, the system for supporting the spring arm is varied, with the frequent result that the resonant point of the system is displaced to such an extent as to cause unnecessary vibrations. Development of a preventive measure against this inconvenience has been desired.

FIGS. 1A to 1C show an example of a structure for mounting spring arms 3 on corresponding head arms 1, respectively, of a head actuator 10 of a conventional disk apparatus such as a magnetic disk apparatus. In this head actuator 10, as shown in FIG. 1B, four head arms 1 are integrally formed with a rotor 1R, into the E-shape as viewed sideways, by aluminum die-casting. Each spring arm 3 is mounted at the forward end of the corresponding head arm 1 through a fixing member 2, and a head 4 is mounted at the forward end of the spring arm 3.

The forward end of the head arm 1 is formed with a caulking hole 6, as shown in FIG. 1C, and the base of the fixing member 2 is formed with a cylindrical protrusion 21 adapted to fit into the caulking hole 6. The base of the spring arm 3 is mounted by spot welding to the fixing member 2, which in turn is fixed on the head arm 1 by caulking (press fitting) with the protrusion 21 thereof inserted in the caulking hole 6. Also, the head 4 is fixedly mounted by bonding at the forward end of the spring arm 3.

The surface of each head arm 1 facing the fixing member 2 is machined to an accuracy of not more than several tens of a $\mu$m in error with reference to the bearing contact surface B of the rotor 1R beforehand. In mounting the fixing member 2 on each head arm 1 by caulking, therefore, as shown by character A in FIG. 1C, the fixing member 2 is kept in close contact with the machined surface of the head arm 1 so that a desired mounting height accuracy of the head 4 may be obtained with reference to the bearing contact surface B shown in FIG. 1B.

In the large-capacity magnetic disk apparatuses recently developed, the requirement of an increased number of disks and a reduced air-bearing height of the magnetic head makes it necessary to strictly secure the mounting accuracy of the magnetic heads and the head arms in the air-bearing direction of the heads. In the conventional method of securing a mounting accuracy in the air-bearing direction of the head, the portion of the head arm 1 where the spring arm 3 is mounted is machined with high accuracy, and the surface of the fixing member 2 is kept in close contact with the high-accuracy machined surface portion of the head arm 1 to determine the height of the magnetic head.

In the conventional structure for mounting at least a spring arm 3 on at least a head arm 1, however, it is necessary to machine with high accuracy as many contact surfaces of the fixing members 2 at the forward ends of the head arms 1 as there are heads 4 to be mounted. Also, in the case where a sufficient thickness cannot be secured for the head arm 1, it is difficult to secure the required accuracy after machining, thereby leading to the problems of an increased machining cost and a lower machining yield.

Further, even in the case where the head arms 1 are produced by inexpensive means such as by plate punching or by integral molding with the rotor 1R by resin molding or aluminum die-casting, the requirement of high-accuracy machining of the forward ends of the head arms 1 constitutes a stumbling block to a cost reduction of the head actuator 10.

Furthermore, in securing the high-accuracy machined surfaces of the head arms 1 to the corresponding fixing members 2 by caulking, respectively, it is a common practice to insert a comb-shaped pressure member in the comb gaps of the head arms 1 to bring the head arms 1 into close contact with the corresponding fixing members, respectively. The variations in the machining dimensions from one head arm 1 to another, however, makes it difficult to bring all the fixing members 2 into close contact with the corresponding head arms 1 in exactly the same manner. As a result, one head arm 1 may be in close contact with the corresponding fixing member 2 in a manner different from the manner in which another head arm 1 is in close contact with the corresponding fixing arm 2. This contact variation causes varied vibration characteristics of the head units and adversely affects the head positioning accuracy.

Specifically, one of the primary causes of a vibration generated in the magnetic head during the recording or reproducing operation is derived from the phenomenon (coupled vibration) in which the vibration of the assembly of the head 4 and the spring arm 3 supporting the head 4 is undesirably coupled with the vibration of the head arm 1 in the case where the natural frequency of the assembly is comparatively close to the natural frequency of the head arm 1. Normally, the assembly and the head arm 1 are designed to have natural frequencies that will not cause any coupled vibration. In the case where the head arm 1 and the corresponding spring arm 3 are coupled to each other by such means as caulking or a screw, however, the head arm 1 and the spring arm 3 are not always kept in close contact with each other over the entire surfaces thereof, but the apparent natural frequency of the spring arm 3 changes with the degree to which it is in contact with the head arm 1, thereby causing a coupled vibration with the head arm 1.

SUMMARY OF THE INVENTION

A first object of the present invention is to provide a structure for mounting spring arms on corresponding head arms in which the coupler between each spring arm and the corresponding head arm has a vibration damping means, so that the requirement of high-density recording of the disk apparatus can be met while at the same time effectively reducing the vibration of the head unit in operation, and the disk apparatuses can be mass produced with the minimum variation between the individual head arms.

A second object of the invention is to provide a jig for mounting spring arms on corresponding head arms which is easily capable of realizing the above-mentioned structure for mounting the spring arms on the corresponding head arms.

In order to achieve the above-mentioned first object of the invention, according to the first aspect of the invention, there is provided a structure for mounting spring arms on corresponding head arms in which at least a pair of head arms for reading and/or writing information on a discoidal recording medium are mounted at the forward ends of the head arms of a head actuator through corresponding spring arms, each head arm is coupled with the corresponding spring arm by means of a predetermined coupler, and the overlapped portion of the head arm and the spring arm other than the coupler includes a vibration damping layer for preventing propagation of the vibration of one part to the other.

The predetermined coupler can be a caulking protrusion formed on the spring arm portion nearer to the head arm and a caulking hole formed in the head arm adapted to be fitted on the caulking protrusion. Also, the base of each spring arm where it is mounted on the head arm can be formed with an expansion wider than the forward end of the head arm as a means of setting the spring arm in position.

In order to achieve the above-mentioned object, according to a second aspect of the invention, there is provided a structure for mounting spring arms on corresponding head arms in which at least a pair of heads for reading and/or writing information on a discoidal recording medium are mounted at the forward ends of the head arms of a head actuator through corresponding spring arms, the base of each spring arm is fixedly welded to a fixing member, each head arm is coupled to the fixing member by a predetermined coupler, and the overlapped portion of the head arm and the fixing member other than the coupler includes a vibration damping layer for preventing the propagation of the vibration of one of the coupled members to the other.

The predetermined coupler can include a caulking protrusion formed on the fixing member portion nearer to the head arm and a caulking hole formed in the head arm and adapted to fit over the caulking protrusion. Also, the base of the fixing member where it is mounted on the head arm can be formed with an expansion wider than the forward end of the head arm as a means for setting the fixing member in position.

In the above-mentioned mounting structure, each vibration damping layer can be filled with an adhesive. The adhesive can be an elastic one. Also, an elastic member of such a material as rubber or plastic elastomer can be inserted in the vibration damping layer.

The head arms can be configured of a punched plate member, of which each surface facing the vibration damping layer can be left rough after punching. Further, in the case where a plurality of head arms are involved, each head arm is integrally formed with a rotor into an E-shape, as viewed sideways, by aluminum die-casting or plastic molding at the end thereof away from the head.

In order to achieve the second object of the invention, there is provided a jig for mounting spring arms on a plurality of corresponding head arms comprising a head actuator, a jig body having a substantially channel-shaped horizontal section and having a recess adapted to accommodate the upright-erected head actuator inserted sideways thereinto, a head arm fixing member having a substantially channel-shaped section formed on each of the opposite wall surfaces of the recess in order to support the base of the head arm, on both sides thereof, pivotally at a predetermined height in the recess, the head arm being fixed by a predetermined operation, a spring arm positioning block having a first positioning protrusion formed on the wall surface facing the opening of the recess for defining the position of the head arm in the swinging direction and a reference space for accommodating the forward end of each head arm and defining the two-dimensional position and the interval of the spring arms mounted on at least one of the surfaces at the forward end of each head arm, the spring positioning block being inserted from the opening at the forward end of the head arm held in the recess for setting the spring arm in position with respect to the head arm, a caulking member insertion hole formed in each of the opposed wall members of the jig body in such a manner as to communicate with the caulking hole of the head arm fixedly positioned in the recess, and a member protruded in the horizontal direction above the jig body for defining the intervals between the forward ends of the two spring arms mounted on the two sides of the forward end of the head arm, wherein the base of the spring arm or the fixing member having a spring arm mounted thereon is inserted into the reference space with the spring arm positioning block mounted on the jig body thereby to set the fixing member in position two-dimensionally at the forward end of the head arm, and an elastic member is inserted in the gap between the base of the spring arm or the fixing member and the head block thereby to set the spring arm in position three-dimensionally at the forward end of the head arm, the forward end of the spring arm is set in position by the spring arm forward end gap defining member, and a caulking means is inserted into the caulking member insertion hole under this condition thereby to fix the spring arm set in position at the forward end of the head arm.

The jig can alternatively comprise a block mounted on the upper part of the jig body with two second positioning protrusions formed on the lower side of each reference space thereof in which the second positioning protrusions are inserted between the head arm and two spring arms to define the gap at the base of the spring arm located in each reference space. In such a case, the spring arm is set in position two-dimensionally at the forward end of the head arm, and then three-dimensionally set in position at the forward end of the head arm by mounting the spring arm base gap-defining block on the jig body.

Further, this jig can comprise a slide guide for sliding the spring arm-positioning block in the horizontal direction while being held at the forward end of the head arm, and two types of spring arm-positioning blocks can be prepared including a first spring arm-positioning block having a horizontal width of the reference space equal to the normal mounting intervals of the spring arms and a second spring arm-positioning block having a width larger than the mounting interval, so that with the slide guide mounted on the jig body having the second spring arm-positioning block mounted thereon, the spring arm is inserted in the reference space of the second spring arm-positioning block, and the second spring arm-positioning block is moved laterally to insert the caulking protrusion into the caulking hole, followed by removing the slide guide from the jig body and replacing the second spring arm-positioning block with the first spring arm-positioning block, and the slide guide having the first spring arm-positioning block mounted thereon is mounted on the jig body thereby to set in position the spring arm two-dimensionally at the forward end of the head arm.

In a structure for mounting spring arms on corresponding head arms according to the present invention, the head vibration characteristics are not varied due to the variations in the manner in which the head arm is in contact with the opposed surface of the spring arm, thereby making it possible to realize a high-accuracy head actuator corresponding to a high recording density. Also, insertion of an elastic member such as rubber or plastic elastomer in the gap between the head arm and the opposed surface of the spring arm and the resulting damping effect of the elastic member attenuates the vibrations of the magnetic head unit thereby to attain an even higher accuracy. Further, in the case where the spring arm is pressed against the jig to define the head height taking advantage of the repulsive power of the elastic member, the jig can be simplified as the parts thereof which otherwise might be required for pressing the spring arm against the reference surface are eliminated.

Also, if the jig according to this invention is designed properly, the head arm need not be machined for defining the height thereof. In the case where a plurality of head arms are integrally molded into an E-shape as viewed sideways with the rotor by aluminum die-casting, for example, the contact portion of the bearing for supporting the actuator and the head-mounting caulking hole can be machined with a single chuck, thereby considerably reducing the cost.

The present invention, as described above, is expected to have the effect of increasing the capacity and reducing the cost of both what is called a high-end magnetic disk apparatus having a large capacity and a high performance, and what is called a low-end magnetic disk apparatus which is designed with primary emphasis placed on a low cost while securing a certain degree of capacity. Also, the present invention is applicable to disk apparatuses regardless of the type of access to the disk of the head actuator, and therefore can find applications in the magnetic disk apparatuses in general as well as other disk apparatuses.

BRIEF DESCRIPTION OF THE DRAWINGS

The present invention will be more clearly understood from the description set forth below with reference to the accompanying drawings, wherein.

DESCRIPTION OF THE PREFERRED EMBODIMENTS

Figure 1A:
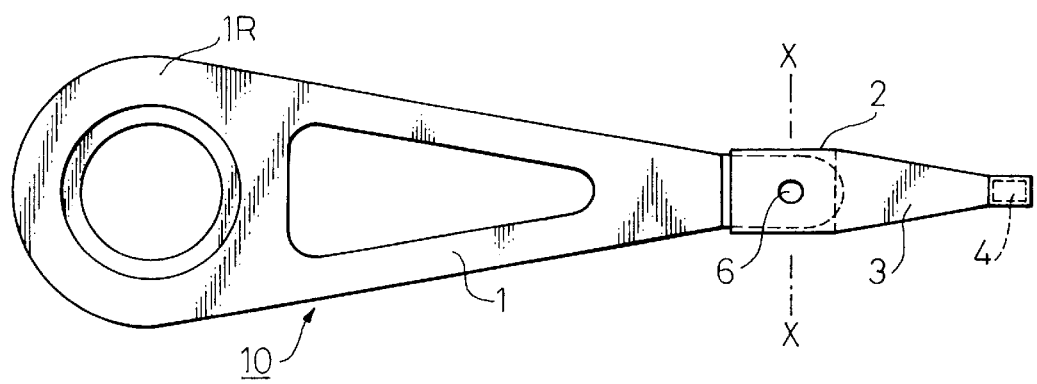
FIG. 1A is a plan view of a conventional head actuator.
Figure 1B:
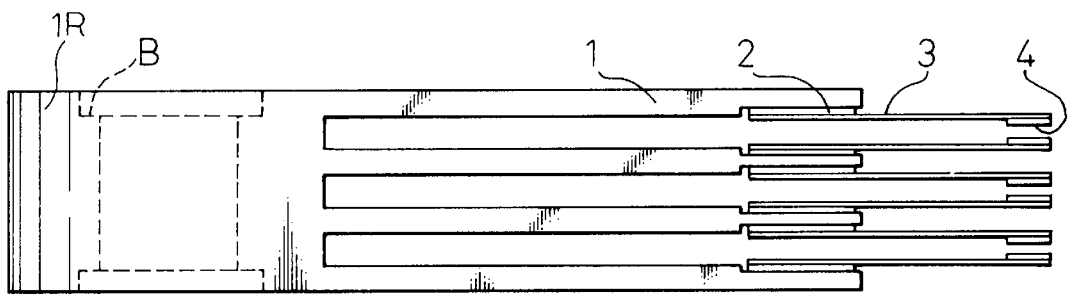
FIG. 1B is a side view of the head actuator shown in FIG. 1A.
Figure 1C:
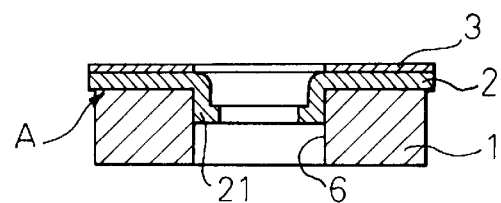
FIG. 1C is a partial sectional view taken in line X—X in FIG. 1A.

Preferred modes of carrying out the present invention will be explained below with reference to specific embodiments shown in the accompanying drawings. For facilitating understanding, the same component members as those in the conventional head actuator described in FIGS. 1A to 1C are designated by the same reference numerals.

Figure 2A:
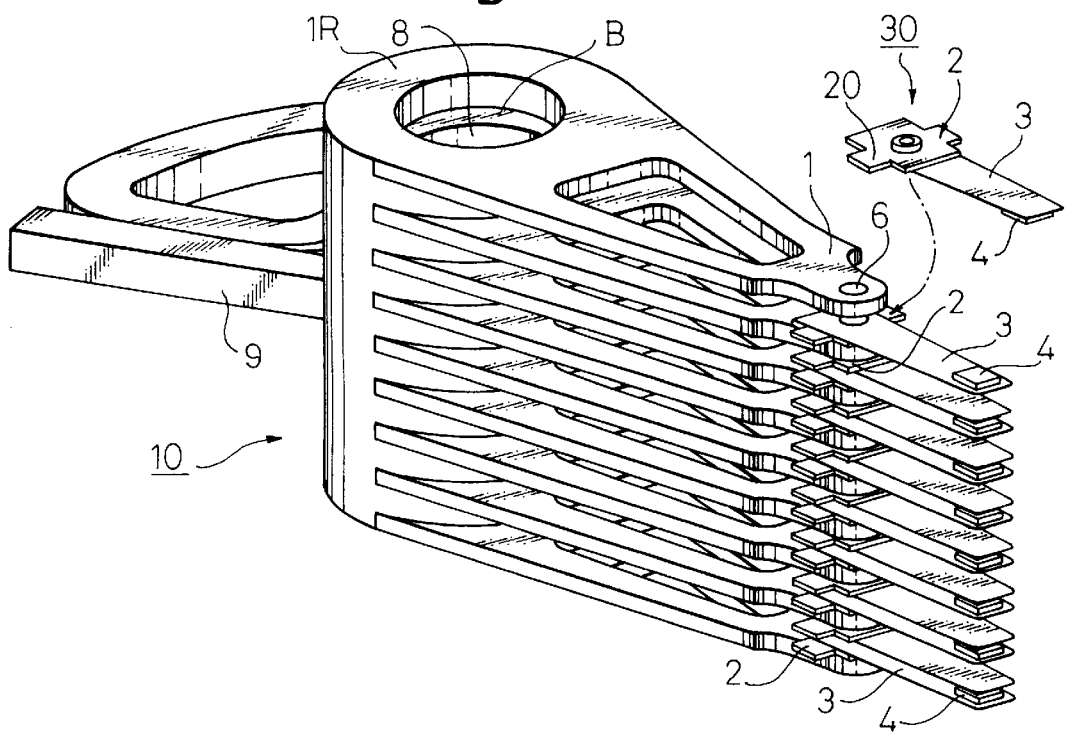
FIG. 2A is a perspective view showing a head actuator employing a structure for mounting a plurality of spring arms on a plurality of corresponding head arms according to the present invention.

FIG. 2A shows a configuration of the head actuator 10 employing a structure for mounting a plurality of spring arms on a plurality of corresponding head arms according to an embodiment of the present invention. The head actuator 10 according to this embodiment is of rotary type used with a magnetic disk apparatus carrying eight disks (not shown). A rotor 1R of this head actuator 10 has nine head arms 1 each having one or two spring arms 3 mounted at the forward end thereof through a fixing member 2. A head 4 is fixedly bonded at the forward end of each spring arm 3. In FIG. 2A, numeral 6 designates a caulking hole described later, numeral 8 a mounting hole for a spring motor formed in the rotor 1R of the head actuator 10, and numeral 9 is a yoke of a drive unit of the head actuator 10. Character B designates a contact surface of the bearing of the spring motor.

Figure 3A:
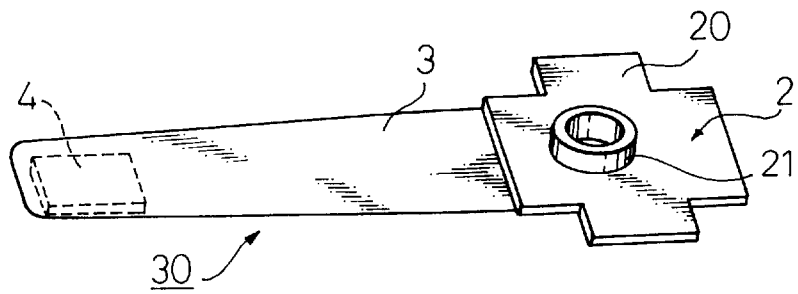
FIG. 3A is a perspective view showing a spring arm assembly used for the structure for mounting spring arms on corresponding head arms according to the first and second embodiments of the invention.
Figure 3B:
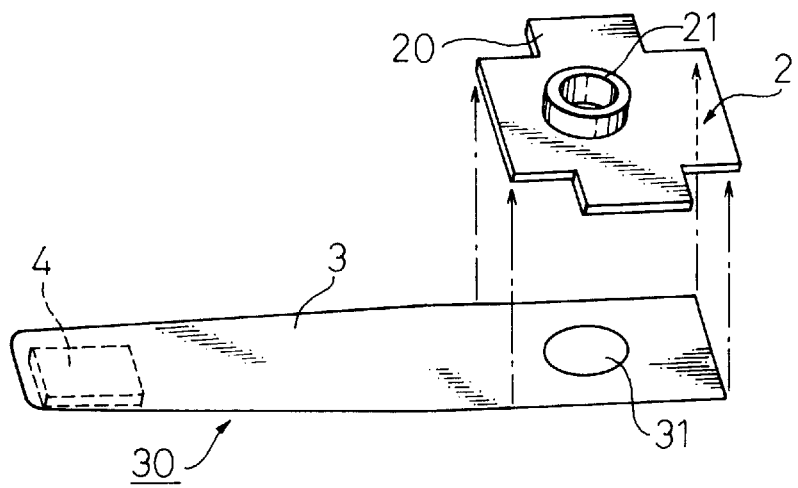
FIG. 3B is an exploded perspective view of the spring arm assembly shown in FIG. 3A.

In the head actuator 10 having this configuration, a spring arm mounting structure according to the first embodiment of the invention uses a spring arm assembly 30 as shown in FIGS. 3A and 3B. In this spring arm assembly 30, as shown in FIG. 3B, the base of the spring arm 3 with the head 4 mounted at the forward end thereof is fixedly welded to the fixing member 2. The base of the spring arm 3 has a caulking member insertion hole 31, and the opposite sides of the fixing member 2 have a positioning expansion 20 described later. The base of the spring arm 3 also has a cylindrical caulking protrusion 21, whereby the base of the spring arm 3 is secured by welding to the fixing member 2 in such manner that the caulking member insertion hole 31 overlaps with the opposed side of the caulking protrusion 21 of the fixing member 2.

Figure 3C:
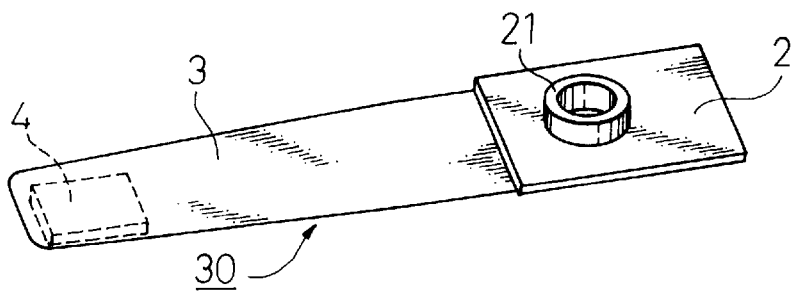
FIG. 3C is a perspective view showing a modification of the spring arm assembly used with the structure for mounting spring arms on head arms according to the first and second embodiments of the invention.

A spring arm assembly 30 lacking the expansions 20 on the opposite sides of the fixing member 2 can be used as shown in FIG. 3C.

Figure 2B:
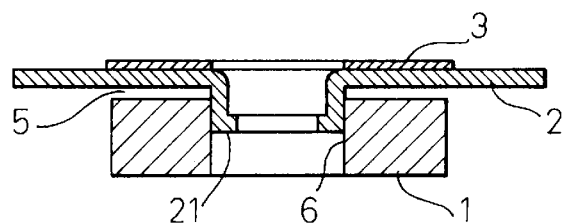
FIG. 2B is a partial sectional view showing a configuration of a portion for mounting a spring on a head arm in a spring arm-mounting structure according to a first embodiment of the present invention.

FIG. 2B shows a structure for mounting a spring arm on a head arm using the spring arm assembly of FIG. 3A according to the first embodiment of the invention. This figure shows a partial section of the portion of the caulking hole 6 in FIG. 2A. According to the first embodiment, the fixing member 2 welded with the spring arm 3 is fixed on the head arm 1 by caulking with the caulking protrusion 21 fitted in the caulking hole 6. In the process, the head arm 1 and the fixing member 2 are coupled to each other only by means of the caulking protrusion 21. The overlapped portion of the fixing member 2 and the head arm 1 other than the caulking protrusion 21 is formed with a vibration damping layer 5 for preventing propagation of vibrations of one member to the other. This vibration damping layer 5 is an air gap according to the first embodiment. The air gap 5 has the same height at every portion thereof.

In the case where the spring arm assembly 30 and the head arm 1 are coupled only by means of the caulking protrusion 1 and the caulking hole 6 in this way, the variations of the vibration characteristic of the head 4 are not caused by the variations in the contact between the head arm 1 and the opposed surface of the fixing member 2. Thus a high-accuracy head actuator 10 meeting the requirements of high-density recording is realized. Also, the machining of the forward end of the head arm 1 for determining the height of the head 4 is eliminated. In the case where a plurality of head arms 1 are integrally formed with the rotor 1R into an E-shape, as viewed sideways, by aluminum die-casting or the like process, for example, only two portions including the portion B of the rotor 1R in contact with the bearing and the caulking hole for fixing the fixing member 2 can be machined. This machining operation can be performed with a single chuck and therefore the production cost can be considerably reduced.

Figure 2C:
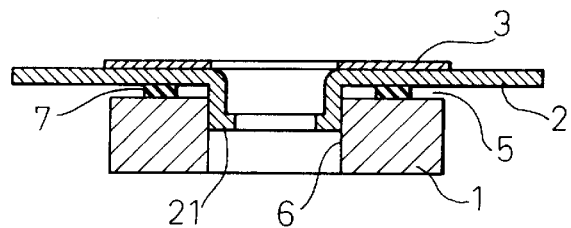
FIG. 2C is a partial sectional view showing a configuration of a portion for mounting a spring on a head arm for a structure in spring arm-mounting structure according to a second embodiment of the present invention.

FIG. 2C shows a structure for mounting a spring arm on a head arm using the spring arm assembly 30 of FIG. 3A according to a second embodiment of the invention. This figure shows a partial section of the caulking hole 6 in FIG. 2A. According to the second embodiment, as in the first embodiment, the fixing member 2 with the spring arm 3 welded thereto is fixed by caulking to the head arm 1 with the caulking protrusion 21 fitted in the caulking hole 6. In the process, the head arm 1 and the fixing member 2 are coupled to each other only by means of the caulking protrusion 21, and the overlapped portion of the fixing member 2 and the head arm 1 other than the caulking protrusion 21 is formed with a vibration damping layer 5 for preventing the propagation of vibrations from one member to the other.

According to the second embodiment, the interior of the vibration damping layer 5 is wholly or partially lined with plastic elastomer as a vibration damping material 7. The vibration damping material 7 can be filled up in the vibration damping layer 5. The vibration damping material 7 can be composed of rubber or another similar elastic material or an elastic adhesive in place of the plastic elastomer.

In the structure for mounting a spring arm on a head arm according to the second embodiment, in addition to the effect of the structure for mounting a spring arm on a head arm according to the first embodiment, the damping effect of the inserted vibration damping material 7 having an elasticity like rubber or a plastic elastomer in the vibration damping layer 5 further attenuates the vibrations of the head 4 for a higher accuracy.

In the above-mentioned two embodiments, the spring arm 3 is fixed on the head arm 1 through the fixing member 2. Alternatively, the spring arm 3 can be fixed on the head arm 1 directly without the intermediary fixing member 2. Such an embodiment will be explained with reference to FIGS. 4A to 4C.

Figure 4A:
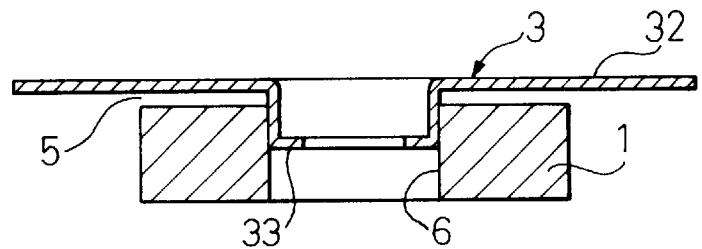
FIG. 4A is a partial sectional view of a configuration of a portion for mounting a spring arm on a head arm in the spring arm-mounting the structure according to a third embodiment of the invention.

FIG. 4A shows a structure for mounting a spring arm on a head arm according to the third embodiment of the invention. This diagram shows a partial section of the portion including the caulking hole 6 in FIG. 2A. A structure for mounting a spring arm on a head arm according to the third embodiment can use the spring arm assembly 35 of FIG. 4C. This spring arm assembly 35 has a positioning expansion 32 on each of the opposite sides of the base of the spring arm 3 with the head 4 mounted at the forward end thereof. A cylindrical protrusion 33 is formed at the central portion of the spring arm assembly 35. Though not shown, a spring arm assembly 35 lacking the expansions 32 can also be used with equal effect.

Figure 4B:
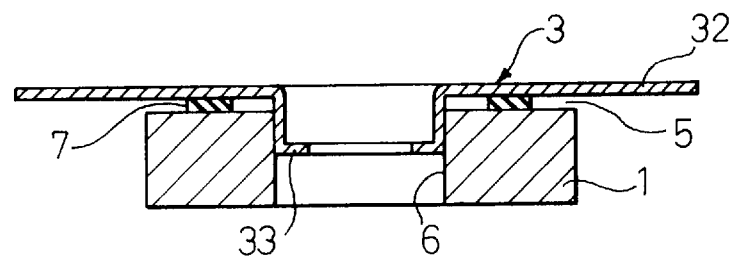
FIG. 4B is a partial sectional view of a configuration of a portion for mounting a spring arm on a head arm in the spring arm-mounting structure according to a fourth embodiment of the invention.
Figure 4C:
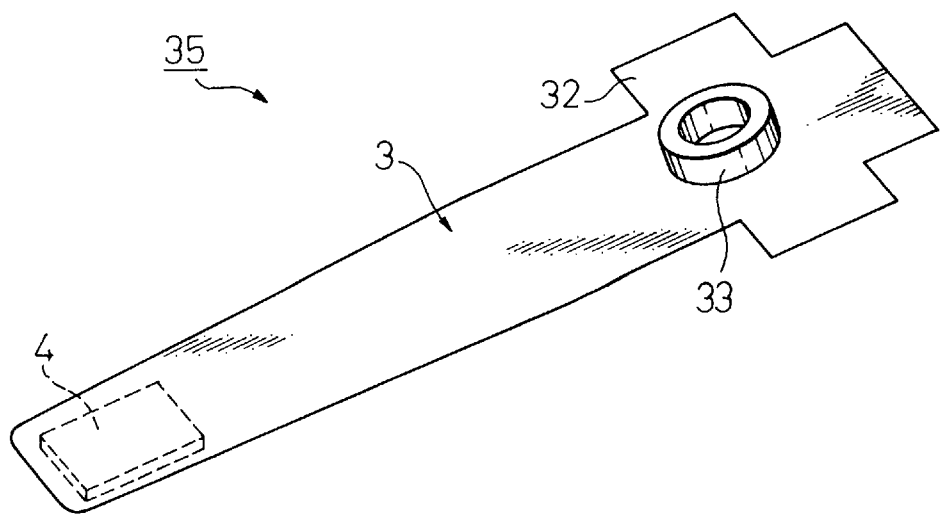
FIG. 4C is a perspective view showing a spring arm assembly used with the structure for mounting spring arms on corresponding head arms according to the third and fourth embodiments.

FIG. 4A shows a structure for mounting a spring arm on a head arm using the spring arm assembly 35 of FIG. 4C according to the third embodiment of the invention. This diagram shows a partial section at the portion including the caulking hole 6 in FIG. 2A. According to the third embodiment, the spring arm 3 is fixed on the head arm 1 by caulking directly with the caulking protrusion 33 thereof fitted in the caulking hole 6. In the process, the head arm 1 and the spring arm 3 are coupled to each other only by means of the caulking protrusion 33, and the overlapped portion of the spring arm 3 and the head arm 1 other than the caulking protrusion 33 is formed with a vibration damping layer 5 for preventing the propagation of vibrations from one member to the other. The vibration damping layer according to the third embodiment is an air gap 5 having a uniform height.

As described above, the fact that the spring arm assembly 35 is coupled with the head arm 1 only by the caulking protrusion 33 and the caulking hole 6 prevents variations in the vibration characteristic of the head 4 which otherwise might be caused by the variations in the contact between the head arm 1 and the opposed surface of the spring arm 3, thereby making it possible to realize a high-accuracy head actuator 10 meeting the requirement of high-density recording. Also, the machining for determining the height of the head 4 at the forward end of the head arm 1 is eliminated, and only two portions including the contact portion B of the bearing of the rotor 1R and the caulking hole for fixing the spring arm 3 are required to be machined. This machining work can be accomplished with a single chuck, thereby considerably reducing the cost.

FIG. 4B shows a structure for mounting a spring arm on a head arm using the spring arm assembly 35 of FIG. 4C according to the fourth embodiment of the invention. The diagram shows a partial section at the portion of the caulking hole 6 in FIG. 2A. According to the fourth embodiment, as in the preceding embodiment, the spring arm 3 is fixed directly on the head arm 1 by caulking with the caulking protrusion 33 thereof fitted in the caulking hole 6. In the process, the head arm 1 and the spring arm 3 are coupled to each other only by means of the caulking protrusion 33, and the overlapped portion of the spring arm 3 and the head arm 1 other than the caulking protrusion 33 is formed with a vibration damping layer 5 for preventing the propagation of vibrations from one member to the other.

According to the fourth embodiment, a vibration damping material 7 is filled in the whole or part of the vibration damping layer 5. This vibration damping material 7 can be composed of an elastic material such as rubber or plastic elastomer or an elastic adhesive.

The structure for mounting a spring arm on a head arm according to the fourth embodiment, in addition to the effect of the structure for mounting a spring arm on a head arm according to the third embodiment, has the effect of attenuating the vibrations of the head 4 further by the damping effect of the vibration damping material 7, having an elasticity, such as rubber or a plastic elastomer, inserted in the vibration damping layer 5.

A configuration and an operation of a mounting jig 40 for realizing the structure for mounting the spring arm 3 on the head arm 1 as described above will be explained with reference to FIGS. 5 to 12.

Figure 5:
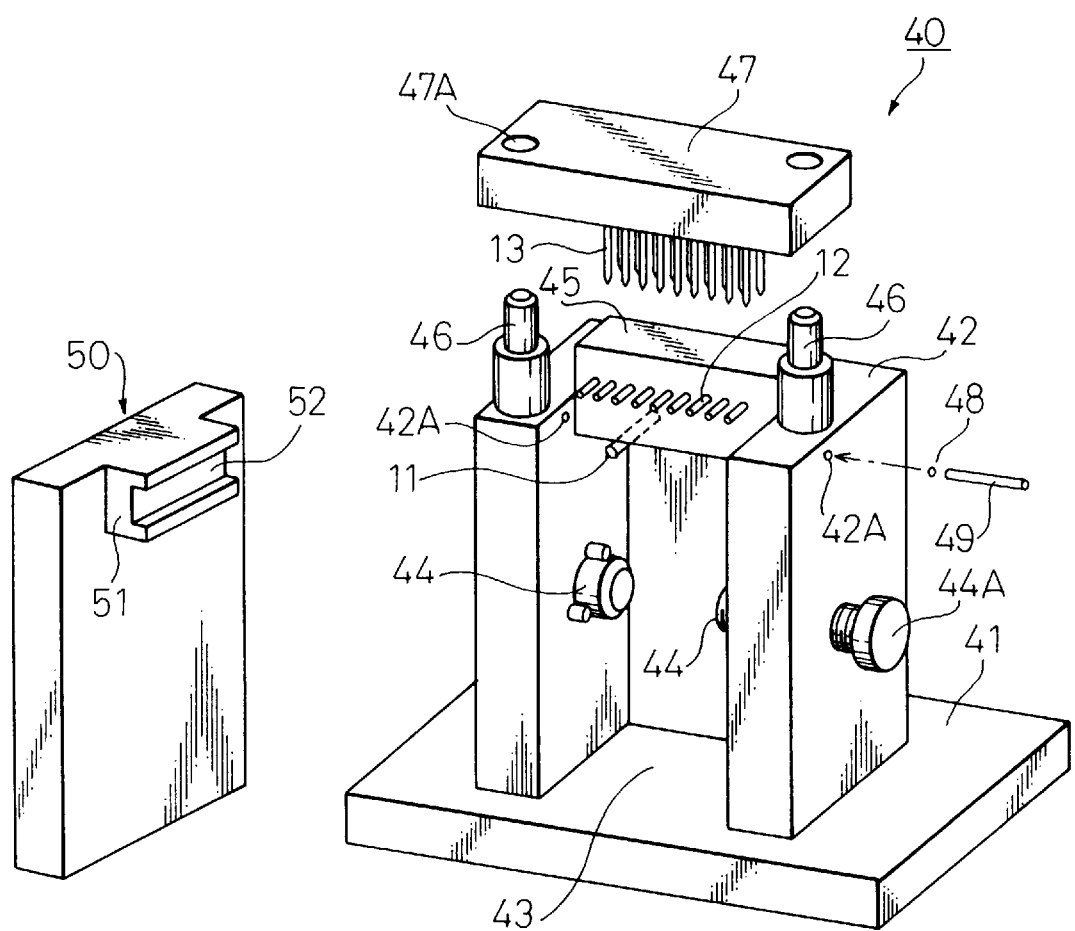
FIG. 5 is an exploded perspective view showing a configuration of each part of a jig for mounting spring arms on corresponding head arms according to this invention.

FIG. 5 is an exploded view of the mounting jig 40 showing a configuration of each part of the jig 40 for mounting the spring arm 4 on the head arm 1. The mounting jig 40 includes a jig body 42 protruded above the base 41, a replaceable block 47 mounted above the jig body 42 and a slide guide 50 mounted on the front surface of the jig body 42.

The jig body 42 includes a recess 43 which can accommodate the portion of the head actuator 10 below the head arm 1 inserted in upright position and sideways thereinto. The recess 43 has a substantially channel-shaped horizontal section, and the opposed wall surfaces in the recess 43 are each formed with a head actuator mounting protrusion 44 for holding the base of the head actuator 10 at a predetermined distance from the two sides. Each head actuator mounting protrusion 44 has the reference surface on the forward end thereof held in contact with the bearing contact surface of the spindle motor mounting hole 8 of the head actuator 10 to thereby set the head arm 1 in position in the recess 43. One of the head actuator mounting protrusions 44 is fixed on the inside wall of the recess 43, while the other head actuator mounting protrusion 44 has a threaded shaft, so that the length of protrusion of the head actuator mounting protrusion 44 into the recess 43 can be adjusted by turning a knob 44A protruded from the outside wall of the jig body 42. Consequently, the head actuator 10 can be held swingably or fixed between the two mounting protrusions 44 by adjusting the degree to which the knob 44A is turned.

Also, a first positioning pin 11 is protruded at a predetermined position on the wall surface facing the opening of the recess 43. This first positioning pin 11 is for defining the position in the direction of swing of the head arm 1 of the actuator 10 held by the head actuator mounting protrusion 44. With the head arm 1 in contact with the positioning pin 11, the knob 44A is turned further. Then, the arm 1 of the head actuator 10 can be set in position in the recess 43 while being fixed between the two head actuator mounting protrusions 44.

A pin mounting base 45 is arranged above the reverse side of the recess 43. A plurality of second positioning pins 12 are protruded from the front side of the pin mounting base 45. The second positioning pins 12 are for adjusting the gap of the spring arm 3 mounted at the forward end of the fixed head arm 1. A caulking hole 42A passing through to the outside wall is formed at the upper part of each of the walls on the two sides of the recess 43. The position where each caulking hole 42A is formed is superposed on the position of the caulking hole 6 formed at the forward end of the head arm 1 mounted in the recess 43. A caulking ball 48 for fixing the protrusion 33 of the spring arm 3 or the protrusion 21 of the fixing member 2 to the head arm 1 by caulking is pressed by a push rod 49 into the each caulking hole 42A.

Further, two mounting bosses 46 are formed on the upper surface of the jig body 42. The mounting bosses 46 are inserted into the mounting holes 47A of the removable block 47 thereby to mount the removable block 47A on the upper surface of the jig body 42. A plurality of third positioning pins 13 are protruded from the lower surface of the removable block 47A for determining the interval between the bases of the spring arm 3 mounted on the head arm 1.

Figure 10A:
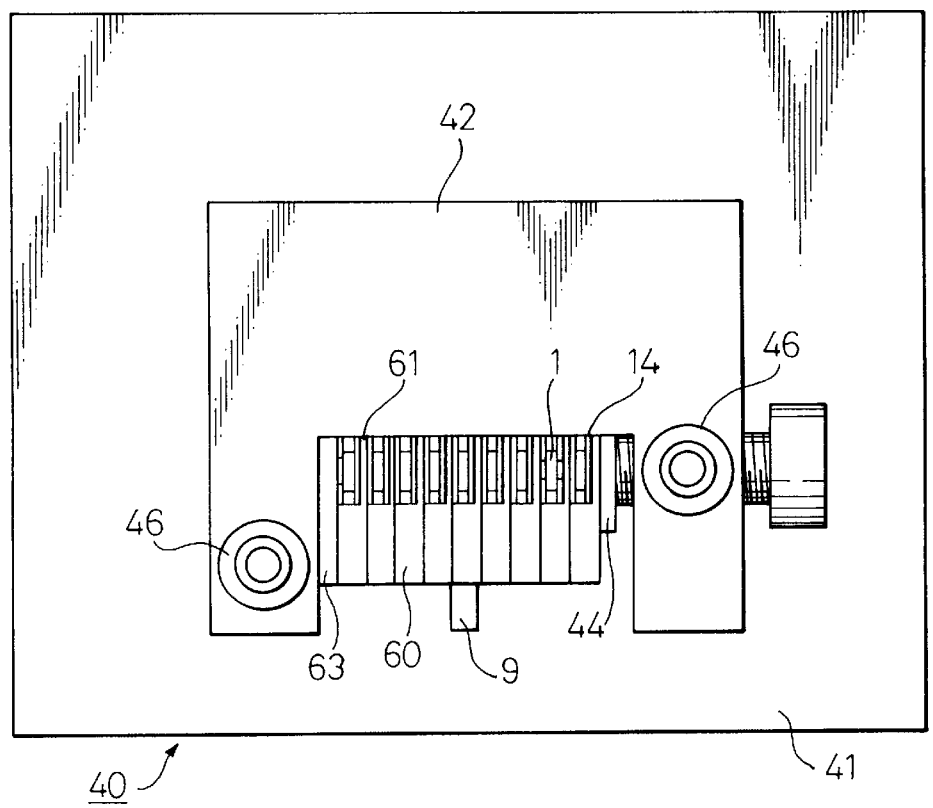
FIG. 10A is a diagram for explaining a pit of a jig for mounting spring arms on corresponding head arms according to the present invention.
Figure 10B:
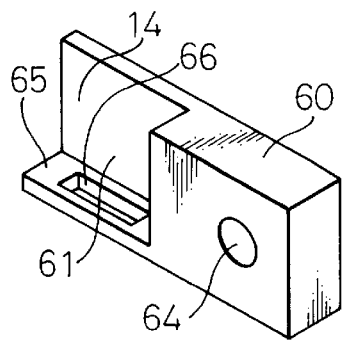
FIG. 10B is a perspective view showing a single pit-forming block in a first form.
Figure 10C:
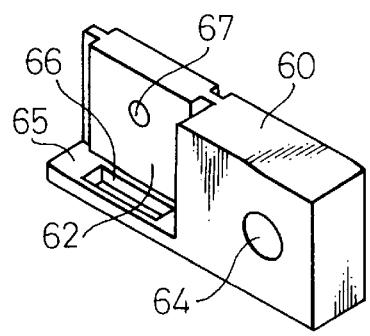
FIG. 10C is a perspective view showing a single pit-forming block in a second form.

The slide guide 50 is a tabular member having a protrusion 51 at the upper part thereof. The top surface of the protrusion 51 is formed with a pit forming block receiving groove 52. The pit forming block receiving groove 52 is for slidably holding a plurality of pit forming blocks 60 as spring arm positioning blocks. The pit forming blocks 60 are of two types. One is a pit forming block 60 having a first thin positioning wall 61 as shown in FIG. 10B, and the other is a pit forming block 60 having a second thick positioning wall 62 as shown in FIG. 10C. The position where the pit forming block receiving groove 52 is formed corresponds to the base of the spring arm 3 when the slide guide 50 is mounted on the jig body 42.

Figure 6A:
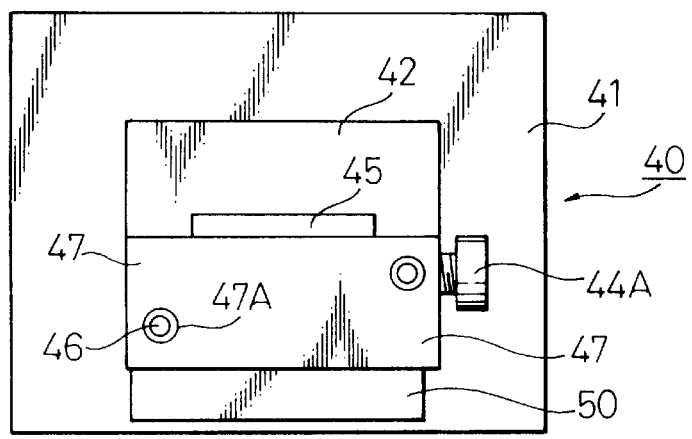
FIG. 6A is a plan view showing a jig for mounting spring arms on corresponding head arms according to this invention.
Figure 6B:
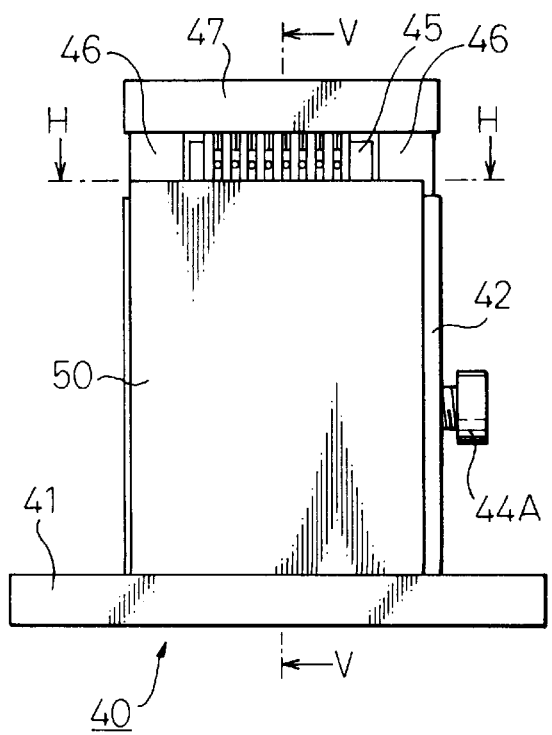
FIG. 6B is a front view showing a jig for mounting spring arms on corresponding head arms according to this invention.
Figure 6C:
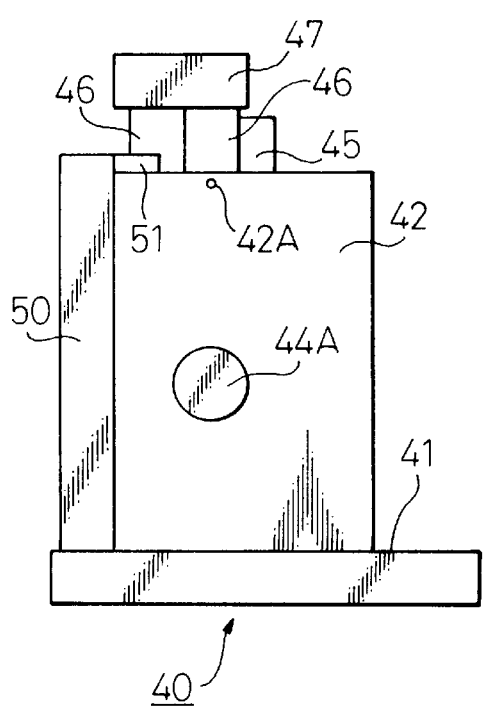
FIG. 6C is a side view showing a jig for mounting spring arms on corresponding head arms according to this invention.
Figure 7A:
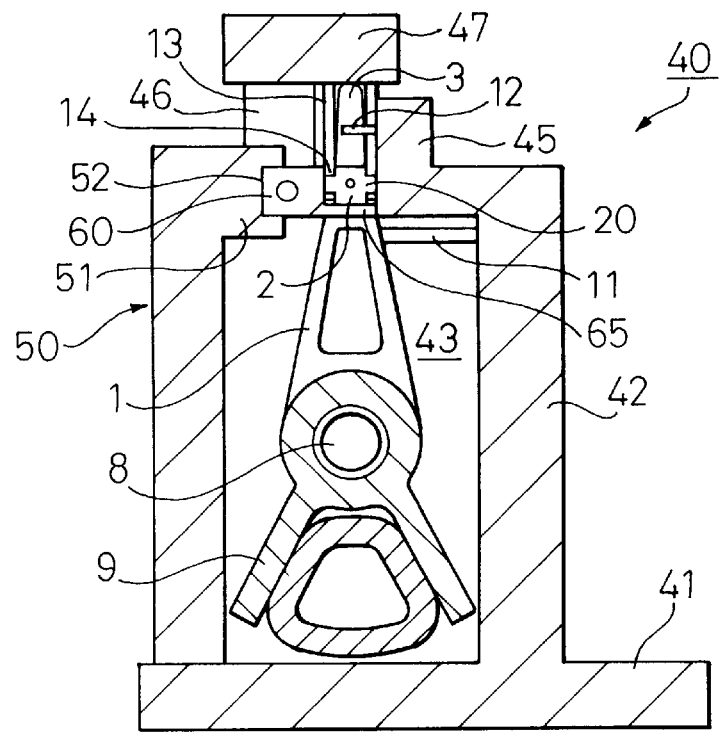
FIG. 7A is a sectional view taken in line V—V in FIG. 6B.
Figure 7B:
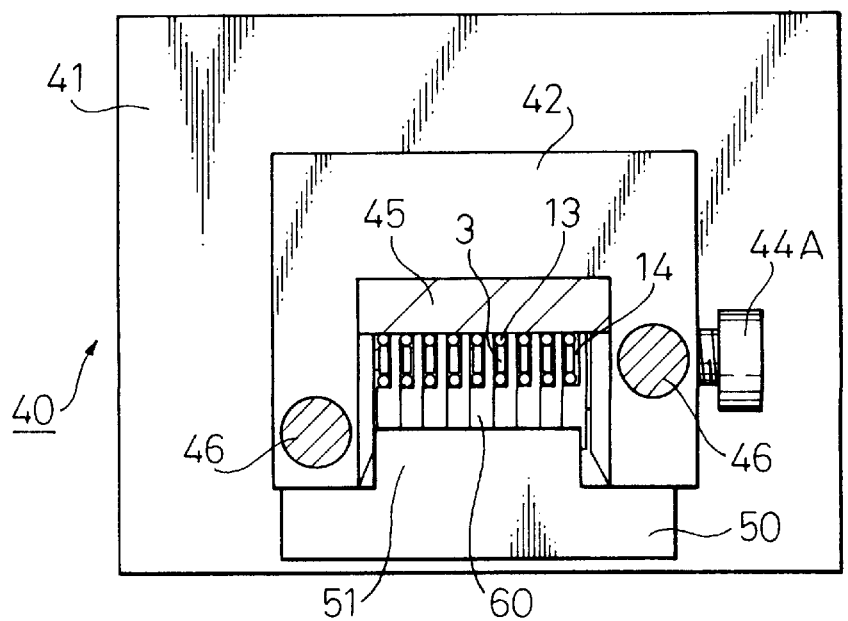
FIG. 7B is a sectional view taken in line H—H in FIG. 6B.
Figure 8:
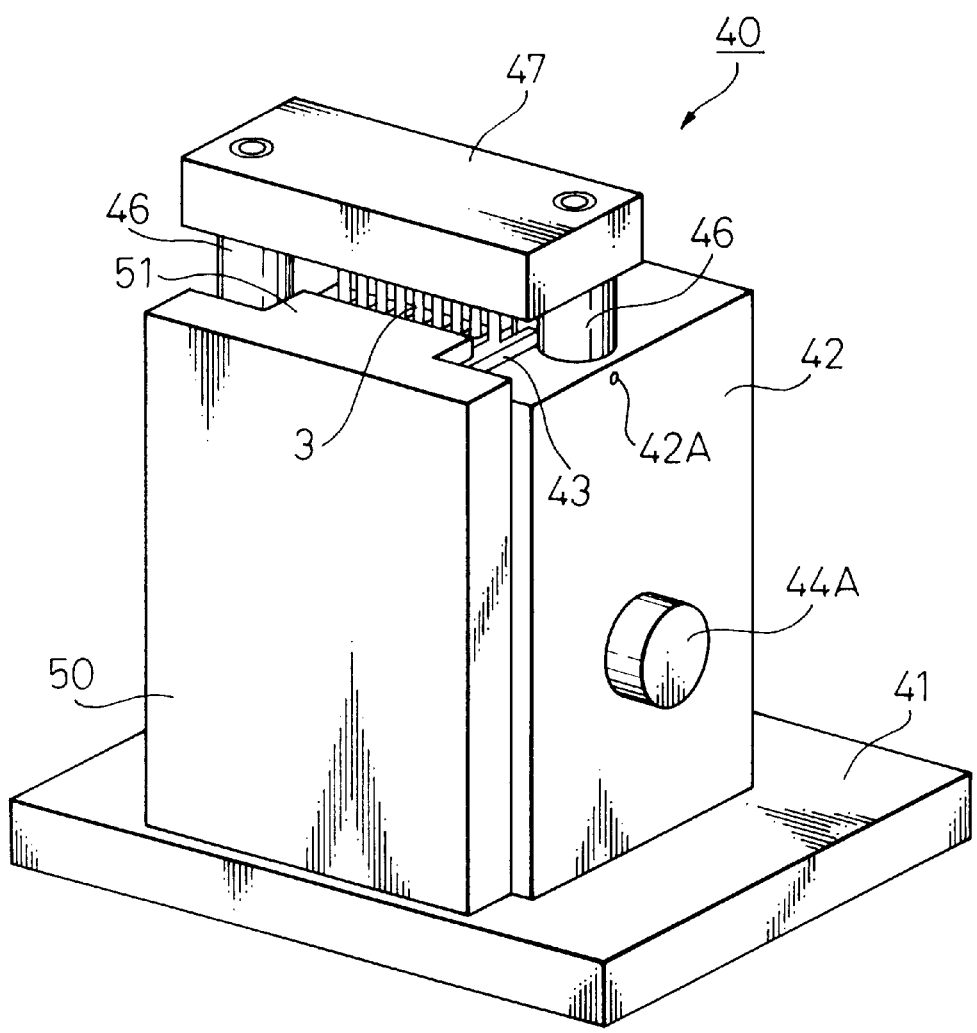
FIG. 8 is a perspective view showing an overall configuration of a jig for mounting spring arms on corresponding head arms according to the present invention.

FIGS. 6A to 6C are diagrams showing three sides of an assembly with the head actuator 10 inserted in the mounting jig 40 of FIG. 5. FIG. 6A shows a sectional view taken in line V—V in FIG. 6B, FIG. 7B is a sectional view taken in line H—H in FIG. 6B, and FIG. 8 is a perspective view of the mounting jig 40 shown in FIGS. 6A to 6C.

The configuration of the mounting jig 40 and the manner in which the mounting jig 40 is used can be understood from these diagrams. Specifically, as seen from FIGS. 7A, 7B, the height of the head arm 1 inserted in the recess 43 of the mounting jig 40 is determined by the head actuator mounting protrusions 44 at the position of the spindle motor mounting hole 8, while the horizontal position of the head arm 1 is determined by the first positioning pin 11. Also, the position of the fixing member 2 mounted on the head arm 1 is defined by the pit forming block 60 inserted in the receiving groove 52 of the slide guide 50, and the width of the fixing members 2, i.e., the width of the spring arms 3 is defined by the second positioning pin 12 and the third positioning pin 13.

Now, the process of mounting a spring arm assembly including the fixing member 2, the spring arm 3 and the head 4 at the forward end of the head arm 1 fixed in the recess 43 of the mounting jig 40 using the mounting jig 40 configured as described above will be explained with reference to FIGS. 5, 7 and 9 to 12.

(1) Mounting the head actuator on the mounting jig

First, the knob 44A of the mounting jig 40 in the state shown in FIG. 5 is turned to pull one of the head actuator mounting protrusions 44 out of the recess 43. Under this condition, the spindle motor mounting hole 8 of the head actuator 10 is supported on the other head actuator mounting protrusion 44, and the knob 44A is turned so that the other head actuator mounting protrusion 44 is protruded into the recess 43 thereby to support the spindle motor mounting hole 8. In the process, the knob 44A is turned only to such an extent as not to fasten the head actuator 10 and to keep the head actuator 10 supported on the head actuator mounting protrusion 44 rotatable.

(2) Fixing the head actuator within the recess

The head arm 1 of the head actuator 10 held on the head actuator mounting protrusions 44 is rotated into contact with the first positioning pin 11. In this condition, the knob 44A is further rotated to fasten the head actuator 10, thereby fixing the head actuator 10 within the recess 43.

(3) Mounting the pit forming block in the mounting jig

Figure 9:
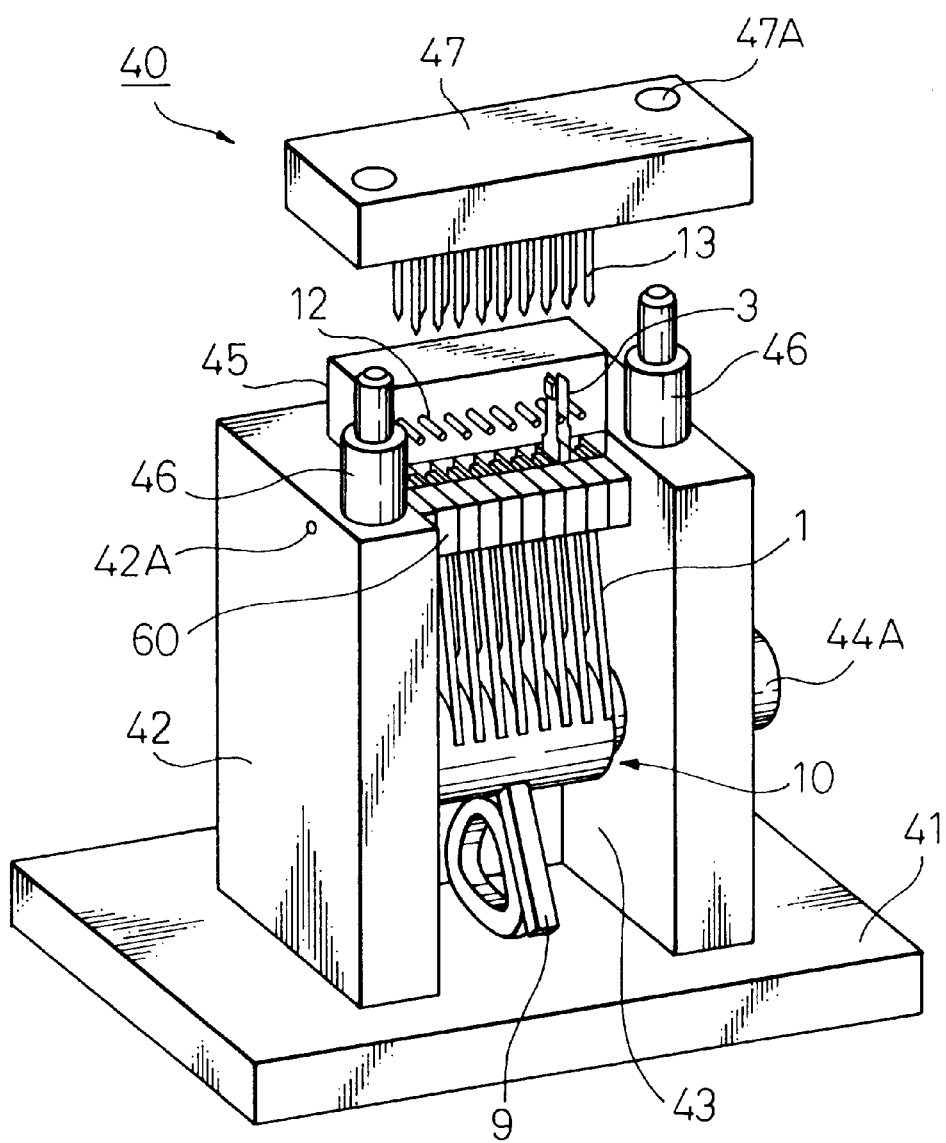
FIG. 9 is a perspective view showing the manner in which a jig for mounting spring arms on corresponding head arms is used according to the present invention.

As shown in FIG. 9, each pit forming block 60 is mounted at the forward end of the corresponding head arm 1. This pit forming block 60 is actually mounted at the forward end of the head arm 1 while at the same being mounted within the pit forming block receiving groove 52 of the slide guide 50 shown in FIG. 5. The slide guide 50, however, is not shown in FIG. 9.

The pit forming block 60 takes either the first form shown in FIG. 10B or the second form shown in FIG. 10C. A plurality of pit forming blocks 60 are arranged in the same number as the head arms 1. A through hole 64 formed in the pit forming block 60 is for arranging a plurality of the pit forming blocks 60 in position. The pit forming block 60 of the first form shown in FIG. 10B includes a thin first positioning wall 61 and a bottom wall 65. The bottom wall 65 is formed with a head arm insertion hole 66. The pit forming block 60 of the second form shown in FIG. 10C, on the other hand, has a thick second positioning wall 62, a bottom wall 65 having a head arm insertion hole 66 and a caulking hole 67. The length of the first and second positioning walls 61, 62 is equal to the width of the two expansions 20 of the fixing member 2. Of the two forms of the pit forming blocks 60, the pit forming block 60 of the first form shown in FIG. 10B is first mounted on the slide guide 50 and set on the jig body 42 with the forward end of the first positioning wall 61 in contact with the pin mounting base 45 as shown in FIG. 10A.

(4) Inserting the spring arm assembly into the pit

Under this condition, as shown in FIG. 9, as many spring arms 3 (having the configuration of FIG. 3A) as required each having the head 4 and the fixing member 2 mounted thereon are dropped from above into the reference space (pit) 14 defined by the first positioning walls 61 and the bottom wall 65 of the pit forming blocks 60 arranged as described above. A spring arm 3 thus dropped into the pit 14, as shown in FIG. 7A, has the side of the fixing member 2 nearer to the head arm 1 set in position along the axis of the head arm 1 by the bottom wall 65 of the pit forming block 60, and the expansion 20 of the fixing member 2 held between the pit forming block 60 and the pin mounting base 45 is set in position in the direction perpendicular to the axis of the head arm 1. In other words, the fixing member 2 is set in position two-dimensionally by the pit 14.

(5) Inserting the protrusion of the spring arm assembly into the head arm

Figure 11:
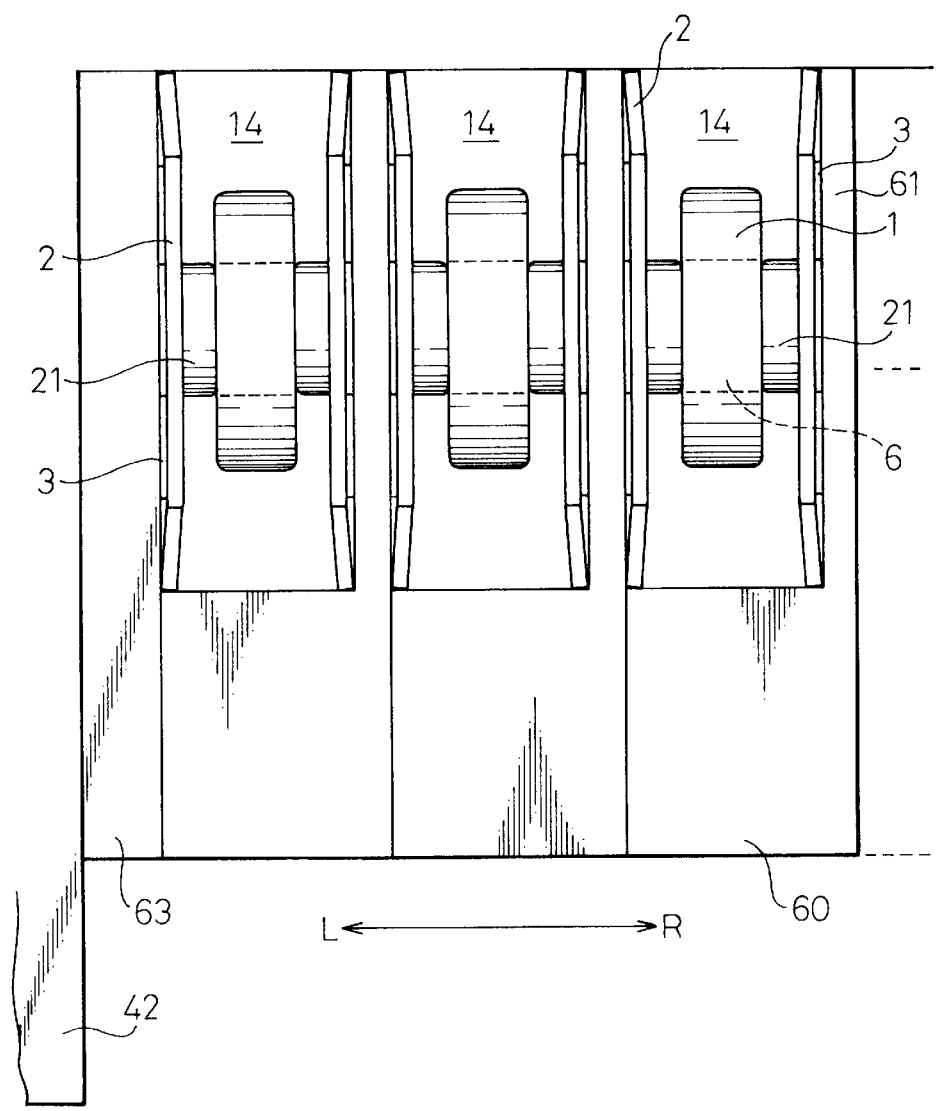
FIG. 11 is a partially enlarged plan view for explaining the manner in which the first pit-forming block is used according to this invention.
Figure 12:
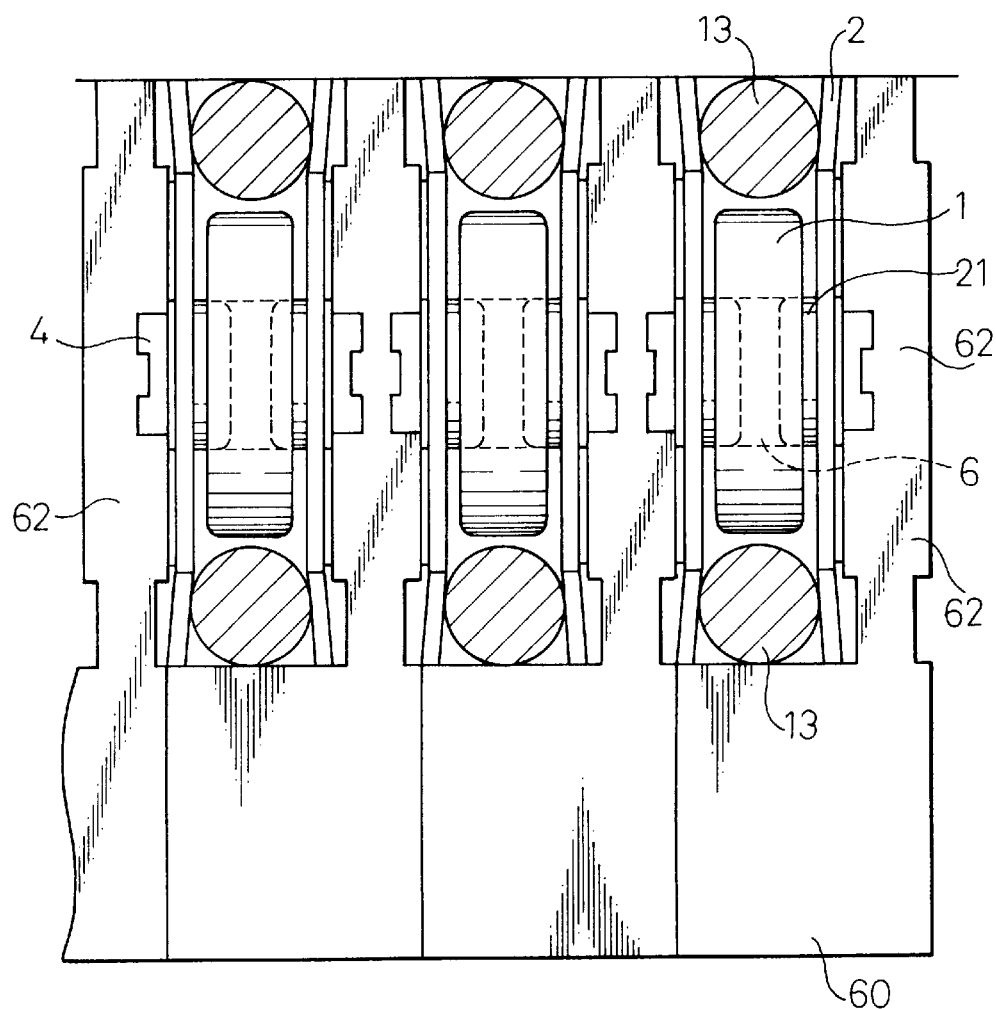
FIG. 12 is a partially enlarged plan view for explaining the manner in which the second pit-forming block is used according to this invention.

FIG. 11 shows the state in which the fixing member 2 and the spring arm 3 are dropped into each of pits 14. Under this condition, the protrusion 21 of the fixing member 2 is yet to be inserted in the caulking hole 6 of the head arm 1. The pit forming block 60 is moved in lateral direction in the pit forming receiving groove 52, i.e., along arrows R and L in FIG. 11, so that the protrusion 21 of the fixing member 2 is inserted in the caulking hole 6 of the head arm 1. The movement of the pit forming block 60 in the L direction is made possible by pulling out the removable block 63 adjacent to the end of the pit forming block 60.

(6) Replacing the pit forming block

After inserting the protrusion 21 of the fixing member 2 into the caulking hole 6 of the head arm 1 by laterally moving the pit forming block 60 as described above, the first form of the pit forming block 60 is pulled out of the mounting jig 40 and removed from the slide guide 50. After that, the second form of the pit forming block 60 shown in FIG. 10C is mounted on the slide guide 50 and set in position on the mounting jig 42 in the same manner as the first form of the pit forming block 60.

(7) Mounting the removable block

Then, as shown in FIG. 9, a removable block 47 is mounted on the mounting jig 42 by inserting the mounting bosses 46 into the mounting holes 47A. In the process, each of the third positioning pins 13 protruding from the lower surface of the removable block 47 is inserted between the two fixing members 2 in each pit 14. The insertion of the third positioning pins 13 into the pit 14 expands the fixing members 2 that have thus far been narrow, and the fixing members 2 are thus set in position by the second positioning walls 62 adjacent thereto. This condition is shown in FIG. 11, where the fixing members 2 are set in position three-dimensionally by the insertion of the third positioning pins 13 into the pit 14.

(8) Coupling the fixing member and the head member

As shown in FIG. 5, the caulking ball 48 is inserted into the caulking hole 42A of the mounting jig 42, and pushed in by a push rod 49. Thus the passage of the caulking ball 48 expands the caulking protrusion 21 of the fixing member 2 inserted in the head arm 1, so that the fixing member 2 is fixedly positioned on the head arm 1.

In this way, the use of the mounting jig 42 according to the present invention causes the spring arm assembly 30 configured of the fixing member 2, the spring arm 3 and head 4 to be set in position two-dimensionally at the forward end of the head arm 1 by the pit forming block 60 mounted on the jig body 42, and then set in position three-dimensionally at the forward end of the head arm 1 by mounting the removable block 47 on the jig body 42. As a result, once the caulking protrusion 21 of the fixing member 2 is fixed on the head arm 1 by caulking under this condition, the structure for mounting the spring arm 3 on the head arm 1 according to the invention is easily realized.

In the above-mentioned mounting jig 40, the spring arm assembly 30 can be three-dimensionally positioned after being two-dimensionally positioned at the forward end of the head arm 1 without using the removable block 47. In such a case, the working process (7') described below is performed instead of the process of "(7) Mounting the removable block".

(7') Inserting an elastic member between the spring arm and head the arm

An elastic member (vibration damping material) 7 is inserted in the air gap 5 between the spring arm 3 and the head arm 1 as shown in FIG. 4B. As a result of holding the elastic member 7 in the air gap between the spring arm 3 and the head arm 1, the spring arm assembly 30 is set in position three-dimensionally at the forward end of the head arm 1.

Although the above-mentioned embodiment concerns the configuration and operation of the mounting jig 40 for realizing a structure for mounting the spring arm on the head arm shown in FIGS. 2B, 2C, the same mounting jig 40 can be used also for realizing the structure for mounting a spring arm on a head arm using the spring arm assembly 35 shown in FIGS. 4A, 4B. In the latter case, however, the third positioning pin of the replaceable block 47 of the mounting jig 40 is required to be increased in diameter or the length along the short side of the pit of the pit forming block must be decreased.

As described above, a structure for mounting a spring arm on a head arm according to this invention can realize a high-accuracy head actuator meeting the requirements of high recording density without causing any variations in the vibration characteristic of the head which otherwise might be caused by the various manners in which the head arm is in contact with the opposed surface of the spring arm. Also, in view of the fact that an elastic member of such a material as rubber or plastic elastomer is held as a vibration damping material in the gap between the head arm and the opposed surface of the spring arm, the vibrations of the magnetic head unit are attenuated by the damping effect of the elastic member for an even higher accuracy. Further, if the head height is determined by pressing the spring arm against the jig taking advantage of the repulsive power of the elastic material, a part is not required for pressing the spring arm against the reference surface, thereby avoiding the complication of the mounting jig.

According to the present invention, a vibration damping layer is interposed between the head arm and the spring arm assembly, and therefore the machining of the head arm for determining the head height is eliminated. In the case where a plurality of head arms are molded into an E-shape, as viewed sideways, integrally with a rotor by aluminum die-casting, for example, only two portions including the contacting portion of the bearing for supporting the actuator and the caulking hole for mounting the head are required to be machined. This machining operation can be performed with a single chuck, thereby greatly reducing the cost.

It will thus be understood from the foregoing description that this invention has the double effect of increasing the capacity and reducing the cost of the magnetic disk apparatus. These effects can be exhibited both for what is called a high-end machine which is a large-capacity, high-performance magnetic disk apparatus available on the market on the one hand and what is called a low-end machine having a certain degree of capacity which is a magnetic disk apparatus designed with the primary emphasis placed on low cost. Also, the invention is applicable to any type of the head actuator including the rotary type and the direct advancing type. The present invention, therefore, can find applications in magnetic disk apparatuses in general and other disk apparatuses as well.

What is claimed is:

1. A structure for mounting at least a spring arm on at least a head arm in an actuator including at least a pair of heads at a forward end of said head arm through said spring arm for reading/writing information in a discoidal recording medium wherein:

a base of said spring arm is fixedly welded to a metal fixing member, said head arm is coupled to said fixing member by a predetermined coupling means, and an overlapped portion of said head arm and said fixing member, other than said coupling means, is formed with a vibration damping layer for preventing the propagation of a vibration of one of said head arm and said spring arm to the other of said head arm and said spring arm, and an expansion for positioning said fixing member is formed at a base of said fixing member, said expansion rendering the fixing member wider than the forward end of said head arm.

2. A structure for mounting at least a spring arm on at least a head arm according to claim 1, wherein said vibration damping layer is filled with an adhesive.

3. A structure for mounting at least a spring arm on at least a head arm according to claim 2, wherein said adhesive is an elastic adhesive.

4. A structure for mounting at least a spring arm on at least a head arm according to claim 1, wherein an elastic member of a material such as rubber or plastic elastomer is inserted in said vibration damping layer.

5. A structure for mounting at least a spring arm on at least a head arm according to claim 1, wherein said predetermined coupling means includes a caulking protrusion formed on the portion of said fixing member nearer to said head arm and a caulking hole formed in said head arm adapted to fit over said caulking protrusion.

6. A structure for mounting at least a spring arm on at least a head arm according to claim 1, wherein said head arm is made of a punched plate member, and the surface of said head arm opposed to said vibration damping layer is kept rough after punching.

7. A structure for mounting at least a spring arm on at least a head arm according to claim 6, comprising a plurality of said head arms, wherein the respective ends of said head arms far from said heads are molded integrally with a rotor by aluminum die-casting or plastic molding into E-shape as viewed sideways.

* * * * *